United States Patent [19]
Rust et al.

[11] Patent Number: 5,771,105
[45] Date of Patent: Jun. 23, 1998

[54] HIGH SPEED SYSTEM FOR GREY LEVEL IMAGE SCALING, THRESHOLD MATRIX ALIGNMENT AND TILING, AND CREATION OF A BINARY HALF-TONE IMAGE

[75] Inventors: Robert A. Rust; David B. Fujii, both of Boise, Id.

[73] Assignee: Hewlett-Packard Company, Palo Alto, Calif.

[21] Appl. No.: 606,468

[22] Filed: Mar. 4, 1996

[51] Int. Cl.[6] .............................. G06K 9/36; H04N 1/40
[52] U.S. Cl. ................................ 358/458; 358/457
[58] Field of Search .......................... 358/298, 534–536, 358/429–433, 456–460, 451, 528; 382/293, 298, 299, 294

[56] References Cited

U.S. PATENT DOCUMENTS

| | | | |
|---|---|---|---|
| 4,246,614 | 1/1981 | Knox | 358/283 |
| 5,124,803 | 6/1992 | Troxel | 358/298 |
| 5,297,289 | 3/1994 | Mintzer | 395/800 |
| 5,305,118 | 4/1994 | Schiller et al. | 358/456 |
| 5,422,742 | 6/1995 | Ostromoukhov et al. | 358/536 |
| 5,438,431 | 8/1995 | Ostromoukhov | 358/457 |
| 5,526,445 | 6/1996 | Smutek et al. | 358/457 |

Primary Examiner—David K. Moore
Assistant Examiner—Stephen Brinich

[57] ABSTRACT

A system converts a source image of grey level pixel values into a destination image of binary pixel values, the source and destination images having different levels of resolution. The system includes a memory which stores at least a portion of a row of source pixels, a corresponding row of a grey level threshold matrix and a relative input index array (RIIA) which employs a single index bit for each column of the destination image. Index bits are read from the memory and placed in an index bit register, and N source pixel values are written into a source register. A scale logic circuit includes N destination image column outputs and is responsive to each index bit, to output one grey level source pixel on each output. An alignment switch is responsive to a clock input to provide N threshold pixel value outputs that are aligned with corresponding destination image pixels. A comparator compares each source grey level pixel with a corresponding threshold pixel value and assigns a binary value in accordance with the comparison action. A controller initially loads the registers with values from the memory and then synchronously operates the system to output, in parallel, N destination image binary pixel values per clock cycle.

11 Claims, 9 Drawing Sheets

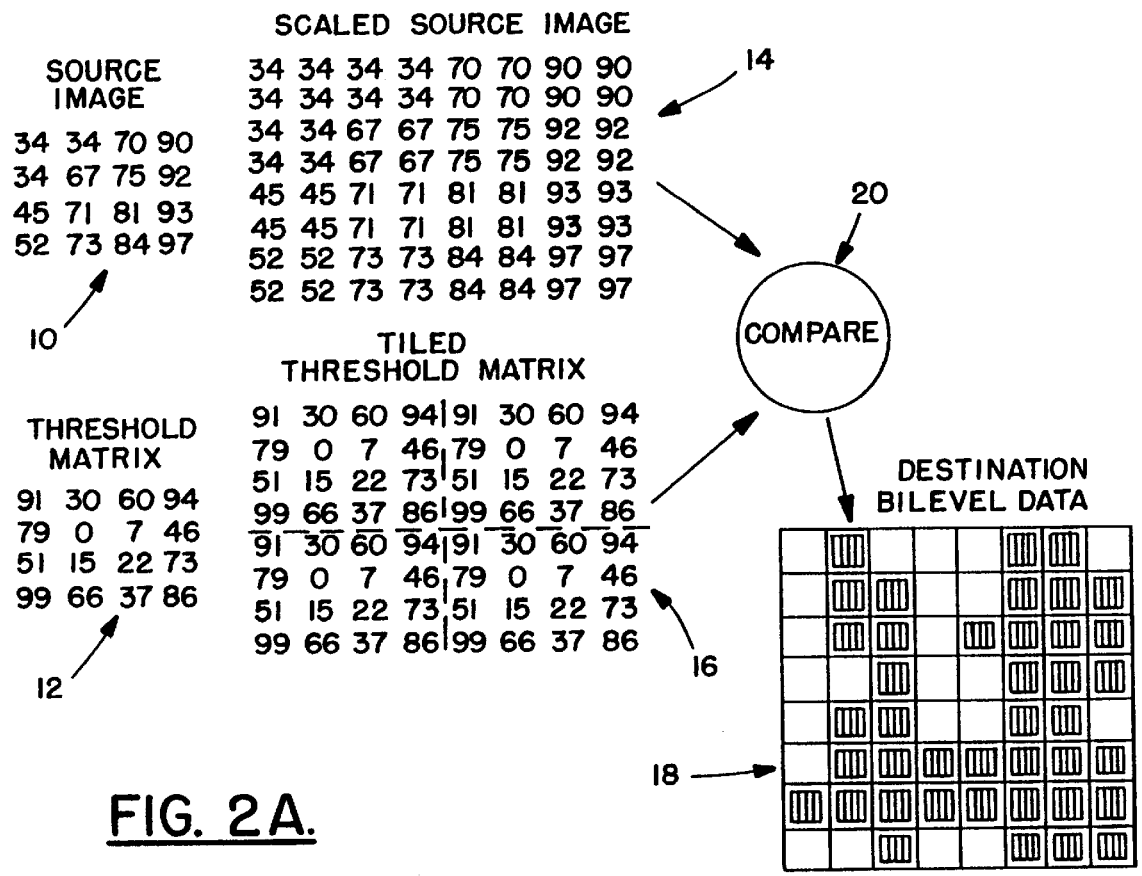

A SINGLE SWATH

HIGH SPEED SYSTEM FOR GREY LEVEL IMAGE SCALING, THRESHOLD MATRIX ALIGNMENT AND TILING, AND CREATION OF A BINARY HALF-TONE IMAGE

FIELD OF THE INVENTION

This invention relates to conversion of grey level images at one resolution to binary half-tone images at a second resolution and, more particularly, to a system which performs such image conversion in a synchronous, high-speed environment.

This invention is related to inventions described in the following Patent Applications:

U.S. patent application Ser. No. 08/610311, entitled "HIGH SPEED SYSTEM FOR IMAGE SCALING";

U.S. patent application Ser. No. 08/610683, entitled "HIGH SPEED SYSTEM FOR THRESHOLD MATRIX ALIGNMENT AND TILING DURING CREATION OF A BINARY HALF-TONE IMAGE".

BACKGROUND OF THE INVENTION

Both color and grey level images are composed of picture elements (pixels), each pixel represented by multiple bits which define either a color or a grey level. In order to represent such images on a bi-level (black and white) printer, the data, if not already grey level, is converted into a grey level multi-bit configuration (e.g. 8 bits/pixel) and then the individual grey level pixels are converted to binary level pixels, using a scaling and dithering process.

The pixels in the original multi-bit per pixel image are usually not at the resolution of the bi-level printer resolution and thus, must be scaled to match the printer resolution. For instance, many modern printers exhibit a 600 dot-per-inch (dpi) resolution, whereas computers output data at a resolution of ⅙ or less than the printer resolution. Accordingly, the bi-level printer is required to spatially scale the received grey level pixels to the printer resolution. Then, the resulting scaled grey level pixels are compared against a threshold matrix which controls the conversion of the grey levels to appropriate patterns of bi-level data. This process is called "dithering."

When 8 bits are employed to represent the grey level, 256 grey levels can be represented. The threshold matrix comprises a plurality of row-arranged grey level values which control the conversion of the grey level pixel values to binary pixel values. In essence, each entry in the threshold matrix is a threshold grey level value which, if exceeded by the image grey level pixel value, causes that grey level image pixel to be converted to a black pixel. If, by contrast, the image grey level pixel value is less than or equal to the corresponding threshold matrix grey level value, it is converted to a "white" pixel.

The aforesaid process is illustrated in FIG. 1, wherein a source image 10 comprises a 4×∝matrix of grey level pixel values. A threshold matrix 12 also, for this example, comprises a 4×∝matrix of grey level threshold values. Assuming that source image 10 is to be scaled up by a factor of 2, a scaling process replicates the original grey level pixel values in source image 10 into the form shown in scaled image 14. Scaling can be accomplished by a pixel replication procedure which causes pixels that are to be replicated to fill in the empty spaces caused by the scaling. Other methods, such as bi-linear scaling are also used to determine the grey level values between original grey level pixel values of the source image. Bi-linear scaling considers neighboring grey level pixel values when filling spaces caused by the scaling.

Next, threshold matrix 12 is "tiled" so that it overlays the entirety of scaled image 14. The tiled threshold matrix 12 is shown at 16 in FIG. 1. Scaled image 14 is next converted to destination bi-level data image 18 by a comparison process which occurs in compare module 20. Each grey level pixel of scaled image 14 is compared against a correspondingly positioned grey level value of tiled threshold matrix 16 and, depending upon whether the scaled image grey level pixel value exceeds, or is equal to or less than the tiled threshold matrix, compare module 20 outputs either a 1 or 0 bit for storage at the corresponding pixel location in destination bi-level data image 18.

In the example shown in FIG. 1, threshold matrix 12 is tiled, starting with its upper left corner, once to the left and once downward. Which part of the threshold matrix to start with is determined by a threshold matrix "anchor" to the page relative to source image 10 and its anchor on the page. More specifically, an anchor defines a point on one image where a specified point of a second image (e.g., a threshold matrix) will be superimposed, thereby enabling the second image to be overlaid on the first image with a known positioning.

In FIG. 2a, a source grey level image 22 is shown. In FIG. 2b, an example is shown of an upscaled version 24 of grey level image 22 that has been upscaled by a factor of 1.5. In FIG. 2c, a grey level image 26 is shown which has been downscaled in resolution by a value of 0.75. In each case, the prior art has accomplished such scaling through the use of a horizontal input index array (HIIA) and a vertical input index array (VIIA). This will be better understood by referring to FIG. 3, wherein source image 30 includes a 4×4 matrix of 16 pixels. Source image 30 is to be converted into a scaled image 32 which is at a 2.5 higher resolution than source image 30. Scaled image 32 thus includes 10 columns of pixels.

To accomplish the scaling action, a processor calculates an HIIA 34 which includes a multi-bit value for each column of scaled image 32. Each HIIA value represents an offset into source image 30 and identifies the pixel from source image 30 that is to be inserted into scaled image 32 at a pixel position which corresponds to the HIIA value. Each HIIA value indicates how many pixels to go into source image 30 to obtain the correct pixel for insertion into a corresponding position in scaled image 32.

The same concept is used in the vertical direction. After a row of a scaled image is completed, a VIIA index bit determines whether the row should be replicated in accord with the scale factor. More specifically, VIIA 36 indicates the first two rows should be indexed to the first row of source image 30. The second two rows of scaled image 32 are to be derived from the second row of source image 30. The scale factor of 2.5 is obtained by scaling some pixels by 3 while scaling other pixels by 2.

FIG. 4 illustrates the application of HIIA's and VIIA's to the scaling of an image using an exemplary bi-linear scaling algorithm. The bi-linear scaling algorithm looks at neighboring pixels when filling in the pixels between the values copied from a source image 40. In the example shown in FIG. 4., the top row, second column pixel value (15) is the result of averaging the first and second pixels in source image 40. By examining HIIA 42, it can be seen that the first pixel of source image 40 will be copied to the first pixel in scaled image 44. The second pixel of source image 40 goes to the third pixel in scaled image 44. The second pixel in scaled image 44 is an interpolated value between the first and third pixels. In FIG. 5, a downscaling example is illustrated wherein a source image 46 is downscaled to scaled image 48 through the use of HIIA 50 and VIIA 52.

In each of the above prior art scaling procedures, substantial amounts of memory are required to store the HIIA and VIIA. For instance, for an 8.5 inch wide sheet of paper on a 600 dpi printer, there are approximately 4,800 dot elements per line. In order to properly address each column of the scaled image, a full 16 bit quantity has been used for each element of the HIIA. Thus, 9.6 kilobytes are required to accommodate the HIIA data. A VIIA is also required to facilitate the scaling of rows in the vertical direction. For an 11 inch long sheet of paper on a 600 dpi printer, there are approximately 6,000 dots in the vertical dimension. 16 bit quantities are also used to address each VIIA row element (which requires 12 kilobytes). Thus, for an entire page, a total of 21.6 kilobytes of memory are required to be dedicated to the input index arrays.

With respect to alignment and tiling of a threshold array matrix across a scaled source image, the prior art procedure consumes significant time performing computations required for each pixel in the resulting tiled image. It must calculate indices for each element in the threshold matrix and retrieve the specific memory element indexed. As a result, the procedure is computation intensive and time consuming. Prior art image conversion procedures thus can take minutes to render images in a software-controlled environment. Such conversion times do not meet the demands of the marketplace.

Accordingly, it is an object of this invention to provide a high speed system for converting a grey level source image into a binary half-tone destination image.

It is a further object of this invention to provide an improved system for converting a grey level source image to a binary half-tone destination image wherein memory resources are conserved.

It is another object of this invention to provide an improved system for converting grey level source images at one resolution to binary destination images at a second resolution.

It is still anther object of this invention to provide an improved system for converting grey level source images to binary half-tone destination images wherein a threshold matrix is aligned and tiled across a grey level destination image in a synchronous, high speed fashion.

SUMMARY OF THE INVENTION

A system converts a source image of grey level pixel values into a destination image of binary pixel values, the source and destination images having different levels of resolution. The system includes a memory which stores at least a portion of a row of source pixels, a corresponding row of a grey level threshold matrix and a relative input index array (RIIA) which employs a single index bit for each column of the destination image. Index bits are read from the memory and placed in an index bit register, and N source pixel values are written into a source register. A scale logic circuit includes N destination image column outputs and is responsive to each index bit, to output one grey level source pixel on each output. An alignment switch is responsive to a clock input to provide N threshold pixel value outputs that are aligned with corresponding destination image pixels. A comparator compares each source grey level pixel with a corresponding threshold pixel value and assigns a binary value in accordance with the comparison action. A controller initially loads the registers with values from the memory and then synchronously operates the system to output, in parallel, N destination image binary pixel values per clock cycle.

DESCRIPTION OF THE DRAWINGS

FIG. 1 is a schematic diagram which illustrates the process of scaling a source image; aligning and tiling a threshold matrix to match the scaled source image; and comparing the scaled source image and tiled threshold matrix to arrive at a destination bi-level image.

FIG. 2a illustrates a source image having plural grey level pixel values.

FIG. 2b illustrates the source image of FIG. 2a after upscaling by a factor of 1.5×.

FIG. 2c illustrates the source image of FIG. 2a after downscaling by a factor of 0.75×.

DETAILED DESCRIPTION OF THE INVENTION

Figure 3:
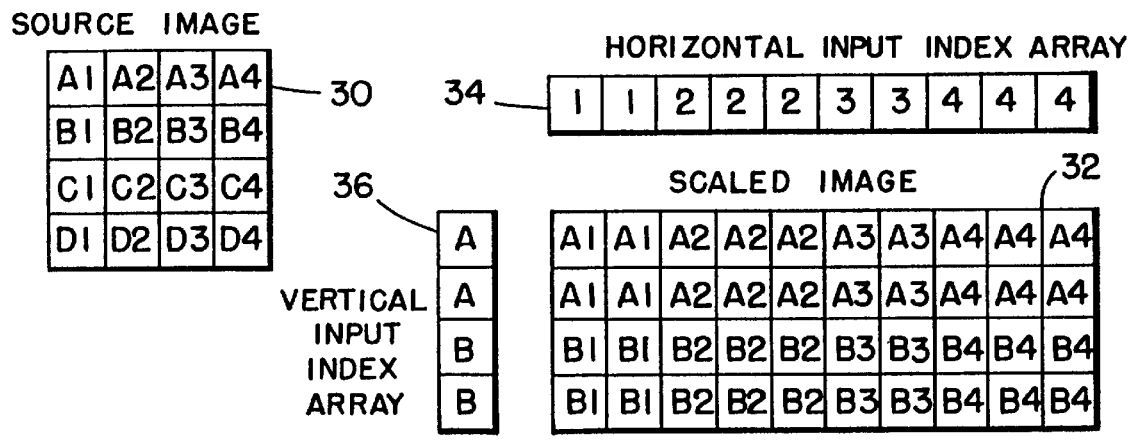
FIG. 3 illustrates a prior art method for upscaling a source image, using multi-bit input index arrays and a pixel replication procedure.
Figure 4:
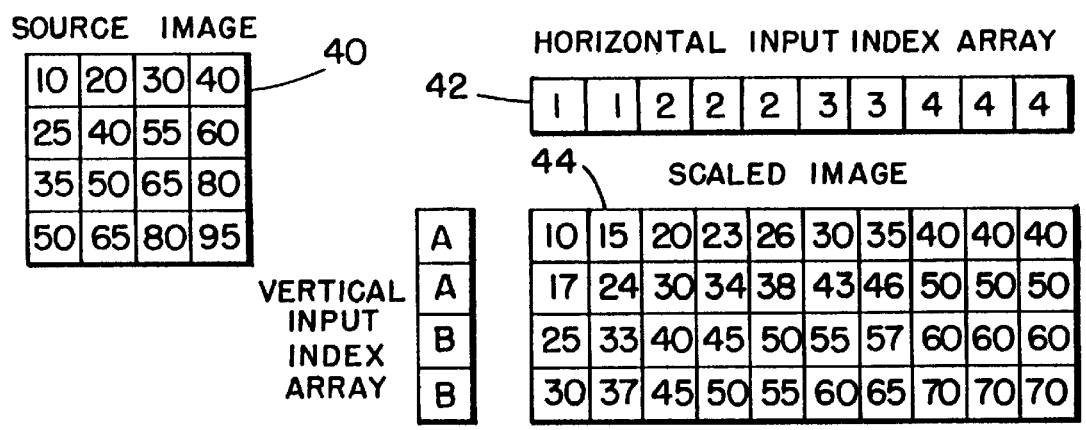
FIG. 4 illustrates a prior art method for upscaling a source image using multi-bit input index arrays, wherein a bilinear scaling algorithm is employed.
Figure 5:
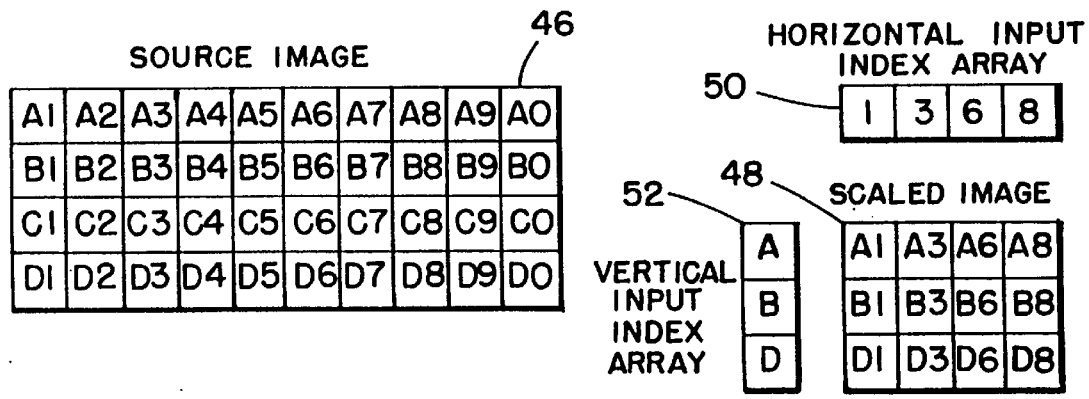
FIG. 5 illustrates a prior art method for downscaling a source image, using multi-bit input index arrays and a sub-sampling algorithm.
Figure 6:
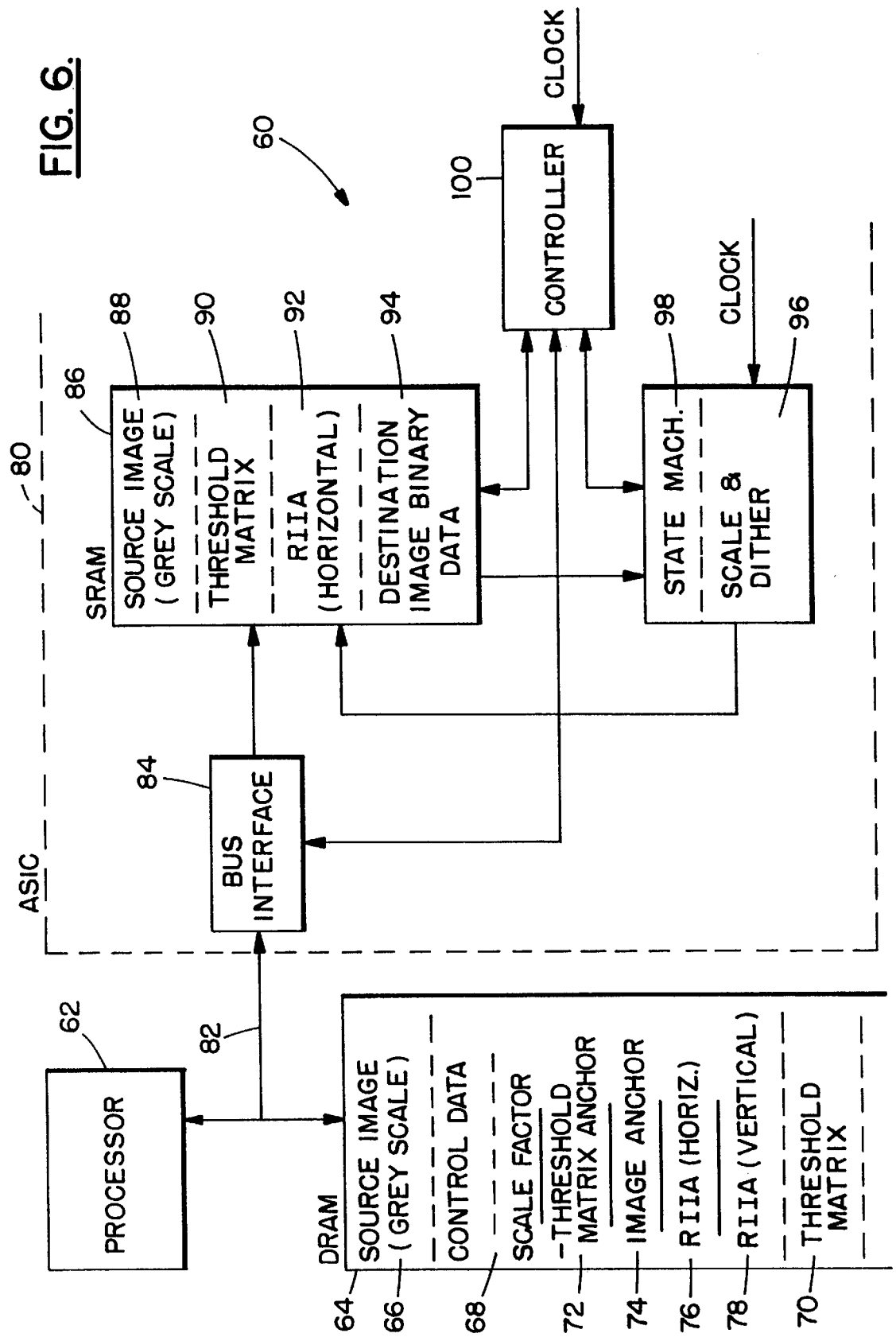
FIG. 6 is a high-level block diagram of a system incorporating the invention hereof.

Referring now to FIG. 6, a system 60 is adapted to convert a source image comprising plural grey level pixel values at a first resolution into a binary pixel destination image at a second resolution. System 60 may be incorporated into a personal computer, a printer, a combination of a personal computer and printer, or in any other combination of apparatus wherein grey level pixel data is converted to binary pixel data of a different resolution.

System 60 includes a processor 62 with an associated dynamic random access memory (DRAM) 64. Processor 62 may have received a grey level source image 66 from an external source or may have generated grey level source image 66 as a result of the processing of an internal application. In order to achieve conversion of source image 66 into a binary destination image, control parameters are required. A scale factor 68 defines the ratio of source image pixels to destination image pixels. In most printer applications, the destination image is at a substantially higher level of resolution than source image 66. Thus, scale factor 68 will generally indicate a value between 2 and 10 (e.g. 6.5), denoting that there are plural destination pixels for each source image pixel.

The control parameters further comprise a threshold matrix 70 which, as stated above, includes plural rows of threshold grey level pixel values which respectively dictate whether a positionally corresponding, scaled source image pixel will be converted to a white or black dot in the destination image. The makeup of threshold matrix 70 is such as to assure that the binary data in the destination image provides as good a grey level representation as is available at the resolution of the destination image. As there are a variety of threshold matrices 70 known in the prior art, further description thereof is not required.

DRAM 64 further includes a threshold matrix anchor which defines where, in the scaled source image, the threshold matrix is to be initially positioned before it is "tiled" across the scaled source image. Threshold matrix anchor 72 will generally define a corner pixel value of the scaled source image. An image anchor 74 defines where in a source image, a particular portion resides that is to be scaled and converted to a binary pixel destination image.

DRAM 64 also stores an RIIA(horizontal) 76 whose structure will be considered in detail below. RIIA 76 is an array of binary value index bits, with one bit for each column of the destination image. RIIA 76 is computed by processor 62 in accordance with scale factor 68. In brief, RIIA 76 is employed to scale source image pixels to the resolution of the destination image. Thus, if scale factor 68 is six, there will be six destination pixels for each source pixel. Each RIIA index bit defines whether a corresponding destination pixel is a function of a current source pixel or a next pixel. In such manner, a single bit per column of the destination image enables a complete scaling of the source image to the destination image resolution, using a minimum of index bits.

A similar function is performed by RIIA(vertical) 78, but RIIA 78 is utilized to determine the similarity or dissimilarity of succeeding rows of destination image data. Both RIIA(horizontal) 76 and RIIA(vertical) 78 are "relative" input index arrays, as they enable source pixel values to be determined based on relationships that are determinable from the index bit values.

As will become apparent from the description below, the conversion of source image 64 into a destination image is accomplished synchronously and in rapid fashion by circuitry contained within an application specific integrated circuit (ASIC) 80. ASIC 80 communicates with both processor 62 and DRAM 64 via a data bus 82 and bus interface 84. A static random access memory (SRAM) 86 is present on ASIC 80 and includes partitioned areas 88, 90, 92 and 94 for storing at least a portion of a row of source image pixels, the threshold matrix, an RIIA (horizontal) for the specific source image and destination image binary data which results from the image conversion action.

A scale and dither module 96 incudes a state machine 98 which performs, in a synchronous manner, a scaling of the source image pixels to the destination image pixel resolution and a subsequent comparison of scaled source image pixels with correspondingly positioned threshold matrix pixels to enable a conversion to binary data. Operations of SRAM 86 and scale and dither module 96 are under the control of controller 100. Clock signals are applied to both controller 100, scale and dither module 96 and state machine 98 to enable synchronous operation thereof when appropriate source image data, threshold matrix data and RIIA index bits have been loaded into registers that are resident within state machine 98. The operation of controller 100 in combination with SRAM 86, state machine 98 and bus interface 84 will be understood from the detailed description to follow.

Figure 7:
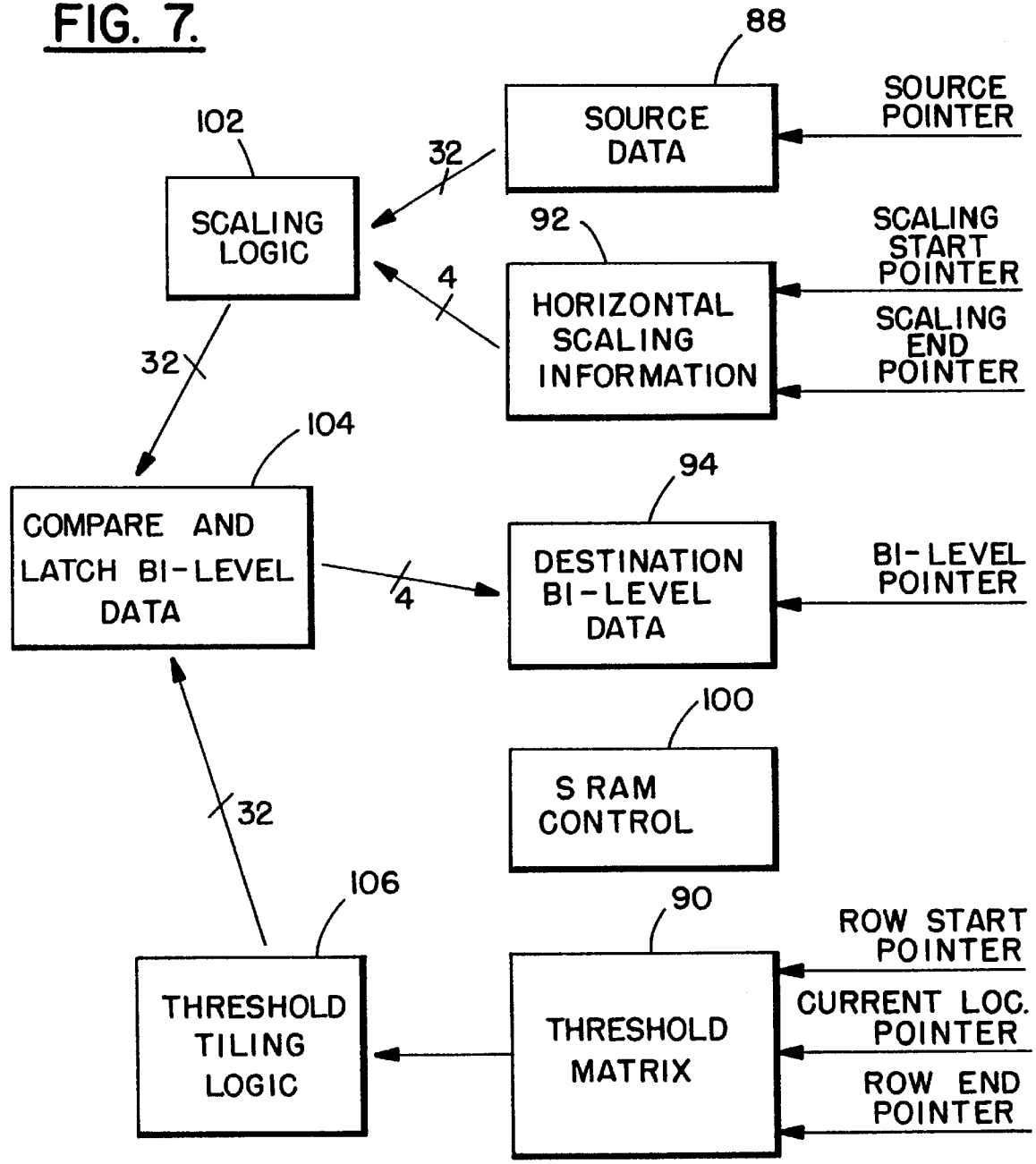
FIG. 7 is a logic flow diagram of the invention, illustrating interaction between various data sources during conversion of a grey level source image to a bi-level destination image.

FIG. 7 is a high level logic flow diagram illustrating interaction of the various data sources employed by the invention. Further, FIG. 7 illustrates a plurality of pointers which are used by state machine 98 to control the operation of the invention. SRAM 86 (FIG. 6) stores source data 88, a threshold matrix 90, horizontal scaling information 92 (RIIA) and destination bi-level data 94. A source pointer is incremented from source image pixel to source image pixel, as each source image pixel is subjected to scaling in scaling logic module 102. In a specific embodiment of the invention, 4 bytes (32 bits) of grey level source pixel data are fed to scaling logic 102 and 4 index bits are fed, simultaneously, from horizontal scaling information 92. A scaling start pointer indicates the next subset of scaling information to be fed to scaling logic 102.

Figure 7A:
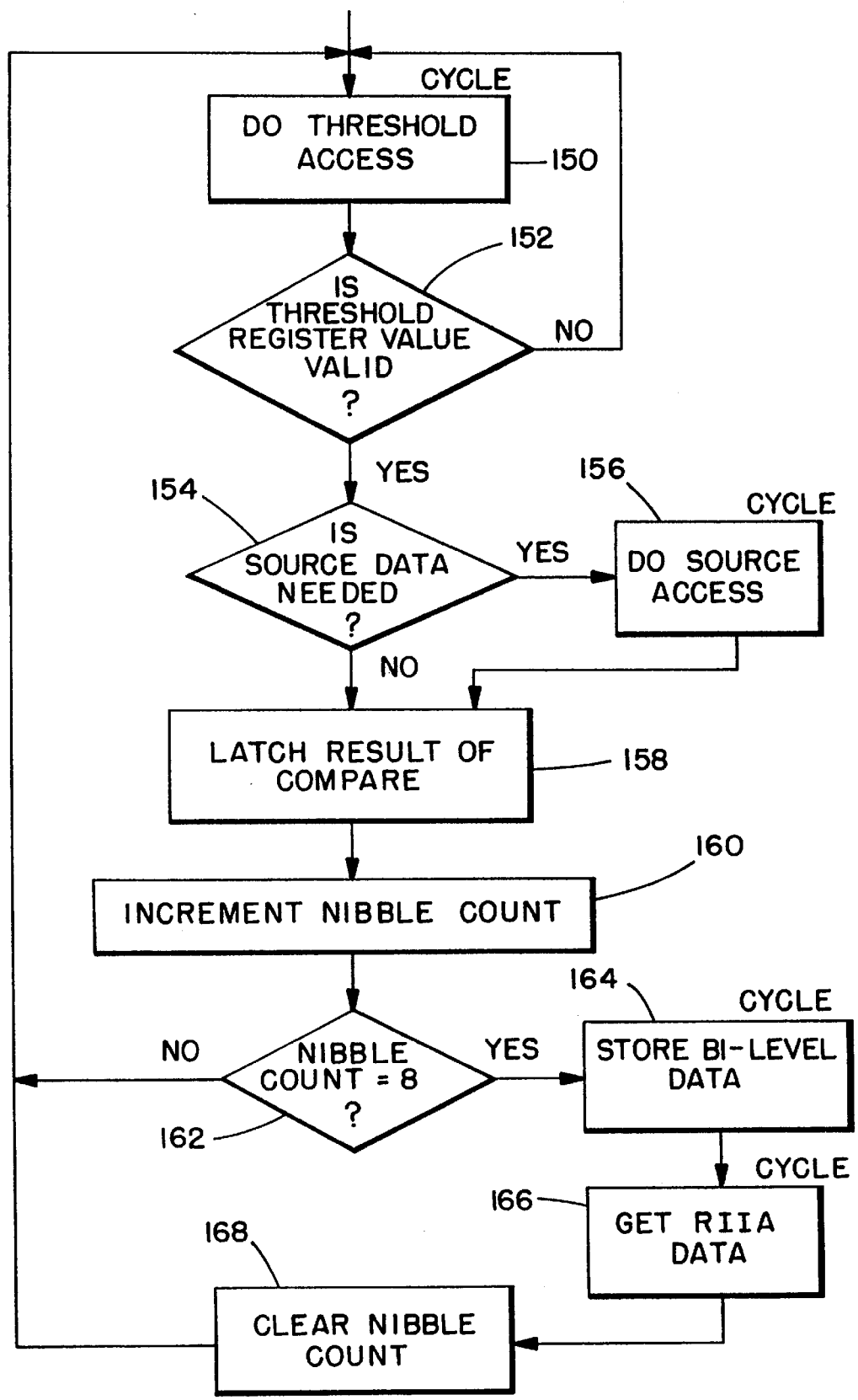
FIG. 7a is a flow diagram which indicates how SRAM accesses are controlled

In FIG. 7a, a high level flow diagram is shown illustrating the procedure for SRAM accesses. Each step denoted by "cycles" indicates that a machine cycle must be used to accomplish the task. Otherwise, a task is accomplished without affecting the performance of the procedure. When a cycle is executed, the pointer to a location in SRAM is incremented.

Initially, an access of threshold data is performed (box 150). Under certain circumstances (to be described below), output tiled threshold values will be invalid and are ignored. This action is indicated by decision box 152 which enables the procedure to continue if the threshold data is valid. Then, if additional source data is needed (decision box 154), an access of source data from the SRAM is performed (box 156) for use by scaling logic 102. A compare action between the threshold data and the scaled source data is then performed and resulting binary destination pixel values are latched (box 158). A nibble count of destination pixels is maintained and is incremented each time four destination pixels are latched (box 160). If the nibble count is not equal to eight, indicating that 32 destination pixel values have not as yet been latched, the procedure recycles (decision box 162). Otherwise the latched bilevel destination pixel data is stored into the SRAM (box 164), additional RIIA data is retrieved from the SRAM (box 166), the nibble count is cleared (box 168) and the procedure recycles.

Figure 8:
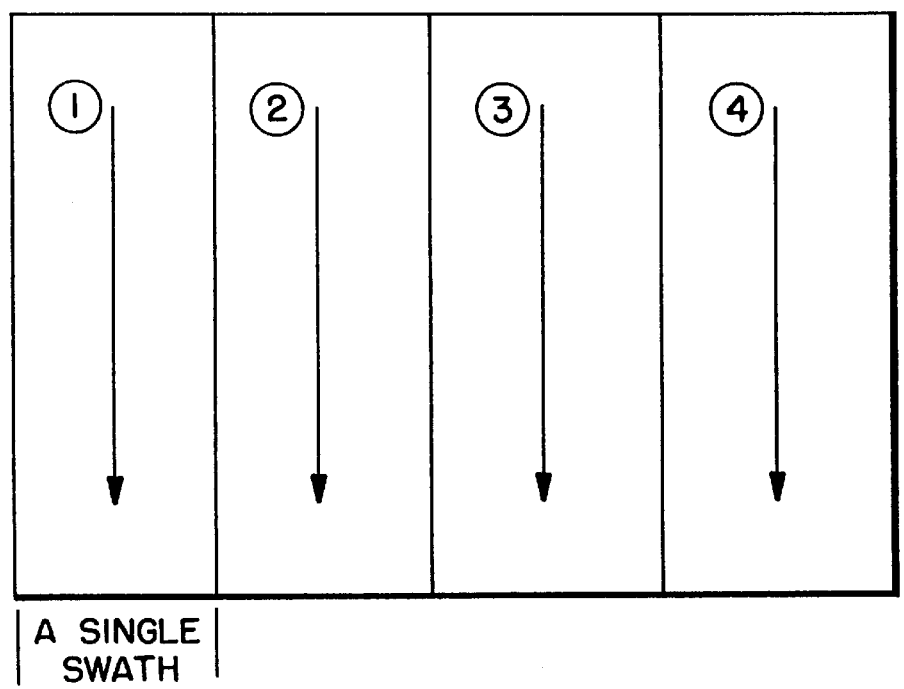
FIG. 8 is a schematic of a raster image page representation, illustrating vertical swaths that are processed by the invention.

Returning to FIG. 7, within scaling logic 102, the received index bits control the switching of individual source image pixels onto one of four byte outputs from scaling logic 102. Those outputs feed a compare and latch bi-level data module 104. Since the scaling operation generally involves a substantial increase in resolution from the source image data to the destination image data (e.g. on the order 6 or more), it is often the case that each source pixel (assuming pixel replication is being used) is replicated 6 times or more under control of the index bits. Further, as will be understood from the description below of FIG. 8, the redundancy of source image pixel data on a row-by-row basis enables many accesses to SRAM 86 to be eliminated.

Simultaneously, with the above described scaling operation, threshold matrix data 90, under control of a row start pointer, current location pointer and row end pointer, is fed to a threshold tiling logic module 106. Therein, the threshold matrix is aligned with a destination image resolution anchor point and is then replicated so as to create a tiled threshold matrix wherein each pixel position of the ultimate destination image has a correspondingly positioned threshold pixel value. Similarly, the output of scaling logic 102 manifests a destination image resolution wherein there is one source image pixel for each pixel location in the destination image.

Each scaled source image pixel and a correspondingly positioned, tiled threshold matrix image pixel value is then compared in compare and latch bi-level data module 104. Dependent upon whether the source pixel value exceeds, or is equal to or less than the corresponding threshold matrix pixel value, an output binary bit is provided to substitute for the source pixel value. Those binary bits are fed to destination bi-level data store 94. The bi-level pointer enables SRAM control module 100 to put the destination binary bits into the correct destination image pixel positions within SRAM 86. FIG. 7 illustrates that the invention performs both scaling and threshold tiling in a substantially parallel and independent basis. Both such actions are synchronously operated under control of applied clock signals, once the appropriate data is loaded into associated input registers. Further, once each row of the destination image is processed, an RIIA(vertical) is used to indicate whether, given the scaling factor of the source image, corresponding source pixels in a next row are identical to the corresponding pixels in the previous row. If it is assumed that a scale factor of 6 or more is being employed, then, on the average, at least 5 succeeding rows will be identical, given the use of a pixel replication protocol.

To enable a reduction in required cycles to accomplish the image conversion action (see FIG. 8), the image is segmented into plural vertical swaths for processing. This takes advantage of the fact that the scale factor in the vertical direction is such that the source data does not have to be accessed for each following row and can be used for successive rows—thus avoiding the associated memory access cycles.

Referring back to FIG. 6, SRAM 86 is preferably (for expense reasons), a single port RAM. The invention interleaves accesses to SRAM 86 by the various logic modules (see FIG. 7) and allows a single address to SRAM 86 to point to a correct location on every clock cycle. SRAM 86 is active on each clock cycle while the invention is processing data.

Figure 9A:
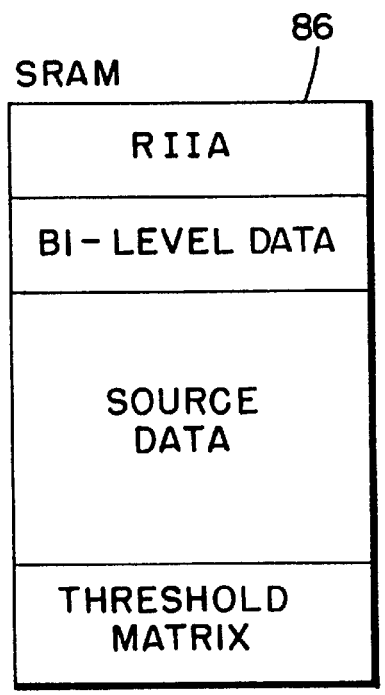
FIG. 9a schematically illustrates a partitioning of memory when a small scale factor is to be applied to a source image.
Figure 9B:
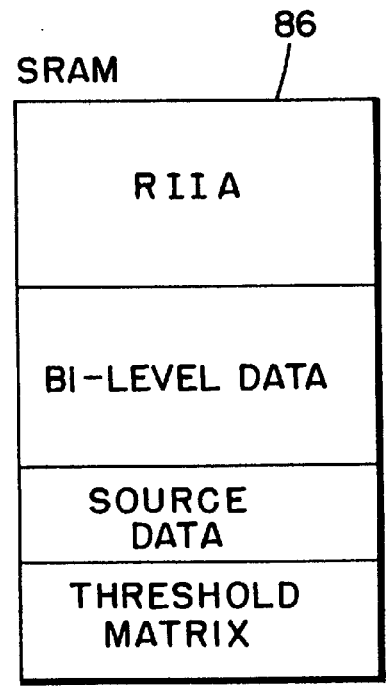
FIG. 9b schematically illustrates a partitioning of memory when a large scale factor is to be applied to a source image.

SRAM 86 can be partitioned at the time an image is rasterized. There are four variable size objects in SRAM 86, i.e., the threshold array (which may vary from image to image), the RIIA, the source pixel data and the destination bi-level data. Through use of a single SRAM 86, controller 100 can achieve a partitioning thereof, given different scale factors and a constant threshold matrix and achieve a most efficient use of its storage capacity. Thus, as shown in FIG. 9a, if a small scale factor is present, controller 100 allocates substantially more memory space to the source image data than the destination bi-level data (as the source image data comprises 8 bits per pixel whereas the bilevel data comprises a single bit per pixel). By contrast, if a large scale factor is employed (see FIG. 9b), a substantially larger area of SRAM 86 is allocated for storage of the RIIA bits and the bi-level data.

Figure 10:
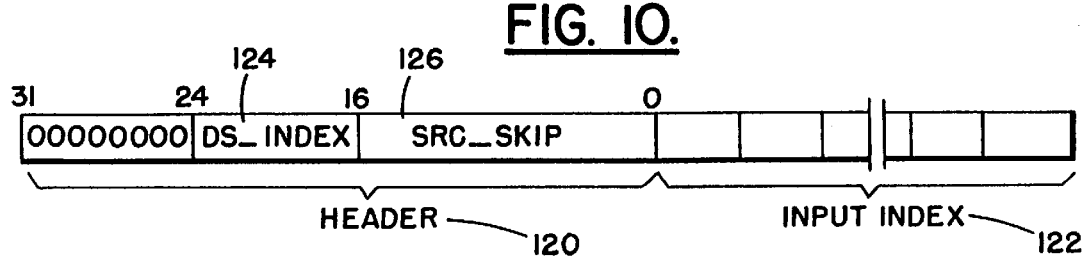
FIG. 10 is a diagram illustrating a "relative" input index array format.

Prior to describing a specific example of the invention, the relative input index array (RIIA) will be described. The RIIA is a highly efficient data array which enables scaling of source image grey level data to the resolution of the destination image data. The RIIA format is shown in FIG. 10 and comprises a 4 byte header field 120 and a variable length input index field 122 that defines what source image pixel is to be used in each scaling action to achieve a source image scaled to the resolution of the destination image. For a 600 dpi printer, the horizontal RIIA's input index portion 122 is 600 dpi×8 inches=4,800 bits or 600 bytes.

Header 120 includes the following fields: an 8 bit DS index field 124 that specifies a minimum number of source pixels to be advanced in each search for a next source pixel to be used in a down-scaling action. For a unity or upscale action, this field is "0". A src skip field 126 is a 16 bit quantity that indicates a number of pixels to be skipped to find a first pixel of a source image which is to be scaled.

Input index 122 comprises a single bit-per-column of the destination image. It is associated with a source pixel pointer that is used in scaling and which points to a current source pixel being used in a destination bit map. The source pixel pointer is initialized to the pixel specified by src skip, i.e., the first pixel to be considered by the apparatus during a scaling action.

There are two general forms of the input index.

Unity or Upscale Case:
In such case, DS index field 124 contains a value of 0. A "0" in a bit position of input index 122 indicates that the pixel indicated by a source pixel pointer is to be used in the destination image. A "1" in a bit position of input index 122 indicates that the pixel indicated by (source pixel pointer+1) should be used in the destination image, and that the source pixel pointer is to be subsequently incremented.

Downscale Case:
This case is specified when DS index field 124 contains a value between 1 to 255. The first source pixel is used as the first destination pixel, regardless of the value of the first bit of the input index 122. For subsequent entries in the array, a "0" value indicates that the corresponding destination pixel will be the source pixel pointed to by (source pixel pointer+DS index). A "1" indicates that the corresponding destination pixel will be the source pixel pointed to by (source pixel pointer+DS index+1). In each case, the source pixel pointer is updated to the new source pixel being used.

RIIA(vertical) works in the same manner, but instead of column pixels, rows are scaled.

It is to be understood by those skilled in the art that the above description employs specific bit and byte lengths for exemplary purposes and that other data lengths can be substituted. However, input index 122 should always have no more than 1 bit position per column of destination image row data.

Figure 11:
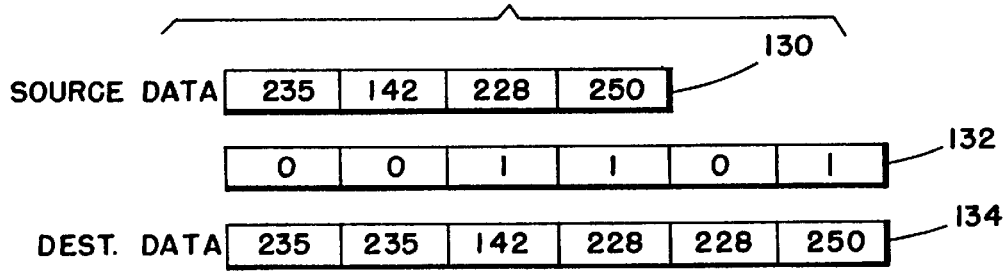
FIG. 11 is a diagram illustrating the relationship between source data and destination data, as controlled by the value of index bit positions of a relative input index array.

Turning to FIG. 11, an example of the use of an RIIA (horizontal) will be described. Assuming that the source image data is being upscaled, the value of DS index 124 is 0; the number of source pixels to be advanced in finding a next source pixel to use in the destination is 0; and src skip=0. The first source pixel to be used in building the destination image is then the first source pixel and none are to be skipped.

Assuming that the first four source pixels are each 8 bit values which equate to grey levels of 235, 142, 228 and 250, their positioning in the source image is as shown in FIG. 11 at 130. Within RIIA 132, there is an input index bit for every byte in destination image 134. Following the above described rules, if an RIIA index bit is "0", the "current" source pixel is put into the destination image and that source pixel remains the current source pixel. If the RIIA index bit is "1", the "next" source pixel is put into the destination image and that next pixel becomes the "current" pixel. In the example shown in FIG. 11, the first 0 in RIIA 132 dictates that the source pixel value of 235 be put into the first destination pixel data position. The second "0" in RIIA 132, following the aforesaid rules, places the value 235 into destination data 134, as the position of the current source pixel has not been incremented. The next "1" value in RIIA 132 indicates that the pointer to the source image pixel must be incremented by one and the pointed-to pixel value placed into the next available destination image pixel position, etc., etc.

The downscale operation will be apparent to those skilled in the art from the aforedescribed upscale procedure.

Figure 12:
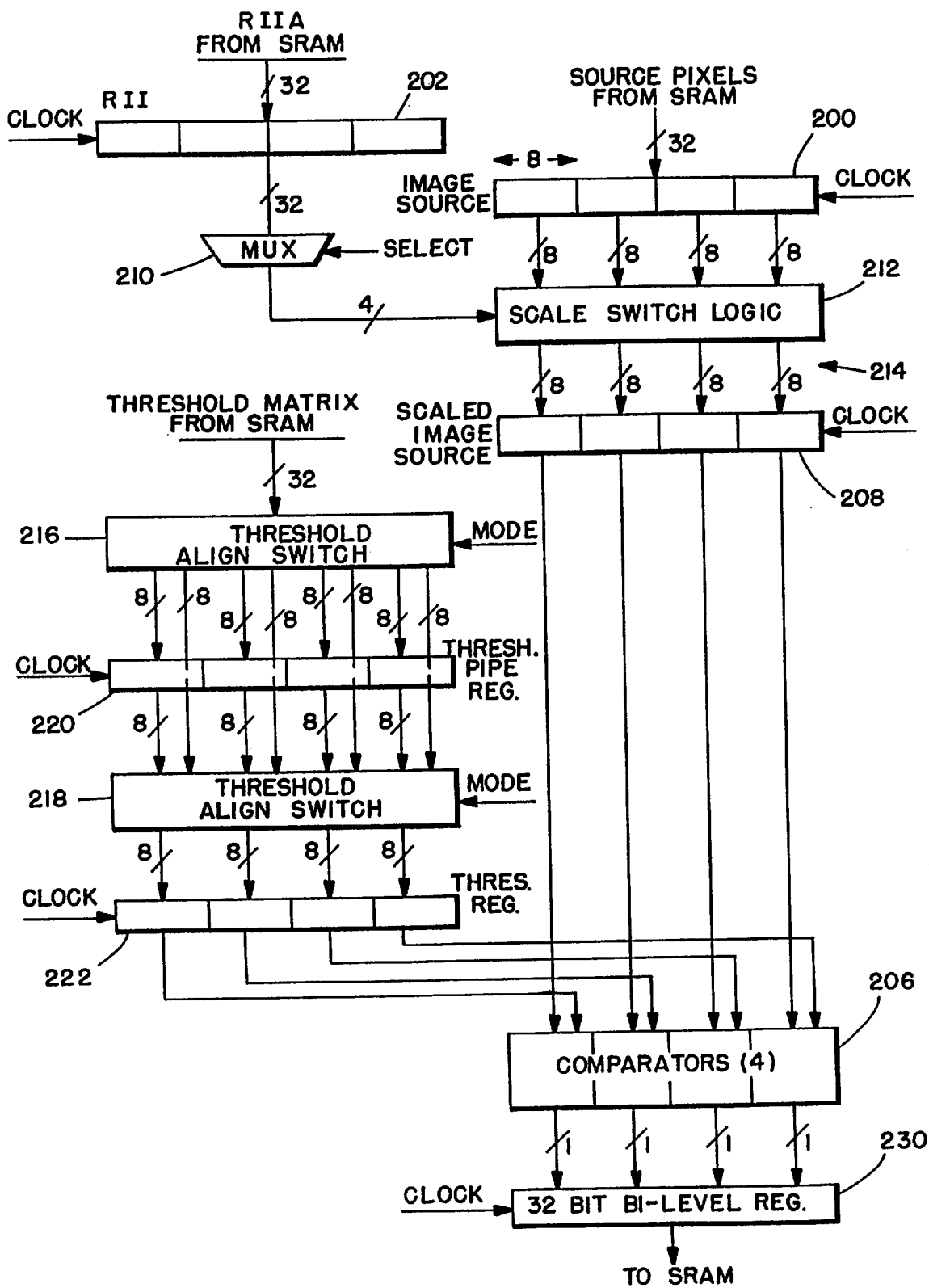
FIG. 12 is a detailed block diagram illustrating a circuit which operates in accordance with the invention.

A further detailed implementation of the invention is shown in FIG. 12 and the following description considers a case of 8-bit-per-pixel data and 4 pixels at a time being handled. The illustrated topology can be scaled to handle any data pixel length with any number of parallel pixels.

In FIG. 12, controller 100 (FIG. 6) causes four 8-bit source pixels to be inserted into image source register 200. Similarly, controller 100 causes plural RIIA(horizontal) index bits to be inserted into RII register 202. Also, a row from the threshold matrix within the SRAM 86 is inserted into threshold staging register 204. Controller 100 accomplishes the writing of data into registers 200, 202 and out of the SRAM at times which assure, during subsequent processing within the system, that all output data will be valid upon a succeeding clock cycle. This action assures that the entire system can be operated synchronously in accordance with sequentially applied clock pulses. Accordingly, the scaling of source pixels to a destination resolution and alignment and tiling of threshold matrix pixel values occur simultaneously and in lock step with applied clock signals. Further, when the threshold matrix pixel values are applied to comparators 206, it is assured that the scaled source image pixels from scaled image source register 208 are present and valid.

While the scaling and threshold alignment functions operate in parallel, the operation of FIG. 12 will be described first with respect to the scaling of the source image pixels and then with respect to the alignment and tiling of the threshold matrix pixel values.

Once controller 100 commences the image conversion operation, each clock signal applied to RII register 202 causes index bit values (in groups of four) to be outputted to a multiplexer 210. A "select" input to multiplexer 210 causes connection of the four index bits to corresponding column positions in scale switch logic 212. Simultaneously, four source pixels from image source register 200 are clocked to scale switch logic 212. In accordance with the rules described above, the applied index bits cause respective ones of the source pixels to appear on plural output lines 214 and to be inputted into scaled image source register 208.

If there are insufficient source bytes in image source register 200, an SRAM access is required. Any residual source pixel values remaining in image source register 200 are loaded into scaled image source register 208 in accord with the RIIA index bits. On the next cycle, the additional source pixels are accessed and loaded into image source register 200.

If it is assumed that a scale factor of 6 or better is being employed, and that pixel replication is the method of scaling, then one 8-bit source pixel will be replicated on each of output lines 214 and will be entered identically into each of the four register positions of scaled image source register 208. The next clock signal will cause each of those source pixel values to be outputted to comparators 206.

Simultaneously with the above scaling action, threshold matrix alignment and tiling is occurring. If the number of threshold matrix pixel values in each row of the threshold matrix is equal to the number of scaled image source pixels in register 208, the alignment function is straightforward. Alignment is accomplished by applying a "mode" signal to a pair of threshold alignment switches 216 and 218. However, when the number of threshold matrix pixel values in a row of the threshold matrix is equal to the number of scaled source image pixels, both threshold alignment switches 216 and 218 are operated to cause the threshold matrix pixel values to flush through threshold pipeline register 220 and be placed into threshold register 222 in corresponding pixel positions.

In the case where the number of threshold matrix pixel values (i.e. =W) in a row of the threshold matrix is not the same as the number (i.e. =N) of scaled image source pixels from scaled image source register 208, the problem of alignment is more complex. Under such conditions, elements from two succeeding threshold matrix pixel row inputs must be used to accomplish proper alignment of the threshold matrix row values with the scaled source image pixel values. That is the reason for the inclusion of threshold pipeline register 220 in addition to threshold register 222. Each threshold alignment switch 216 and 218 operates in a multiplex fashion to steer threshold matrix pixel values to align the threshold matrix pixel values with the scaled image source values. Note that the outputs from threshold alignment switch 216 are not only fed into threshold pipeline register 220, but are also fed directly to threshold alignment switch 218 and bypass threshold pipeline register 220.

Figure 13A:
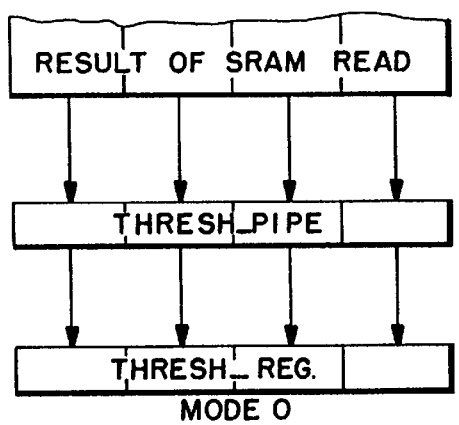
FIGS. 13a–13d illustrate four mode-controlled interconnections between a threshold matrix register and a threshold output register.
Figure 13B:
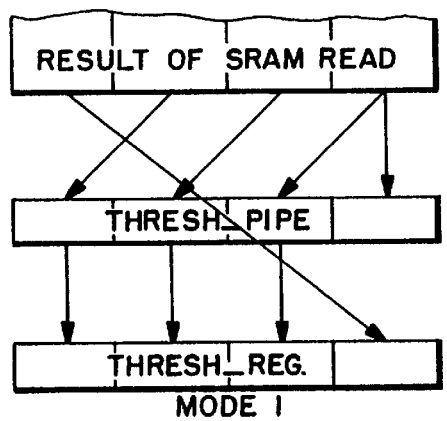
Figure 13C:
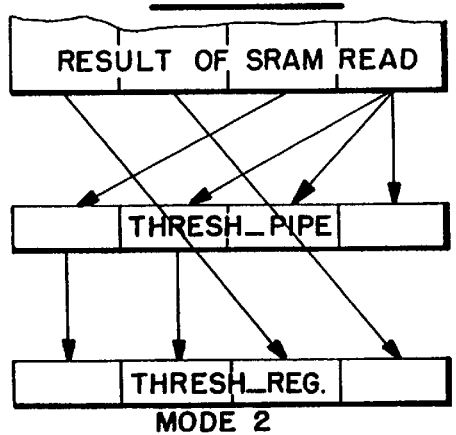
Figure 13D:
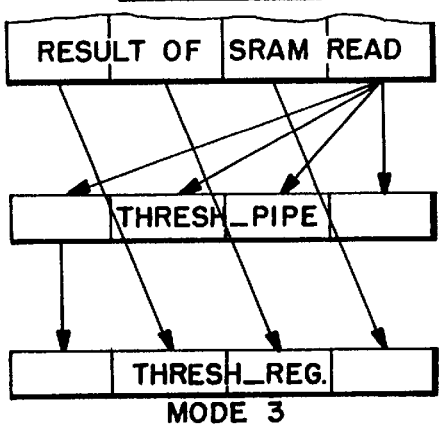

Each of threshold alignment switches 216 and 218 is controlled, as aforesaid, by mode inputs from controller 100. As shown in FIG. 13a–13d, controller 100 applies N distinct mode signals in accordance with the width W of the threshold matrix row and its relationship to the scaled image source data from register 208. Thus, as shown in FIG. 13a, mode 0 is used when W is equal to N (where N is the number of pixels of the scaled image source data in register 208). Each of the other modes illustrated in FIG. 13b, 13c and 13d enables the switching of the threshold pixel values read out from the SRAM, in a pipeline fashion, into threshold register 222 in a modified alignment which takes into account the difference between W and N.

Figure 14:
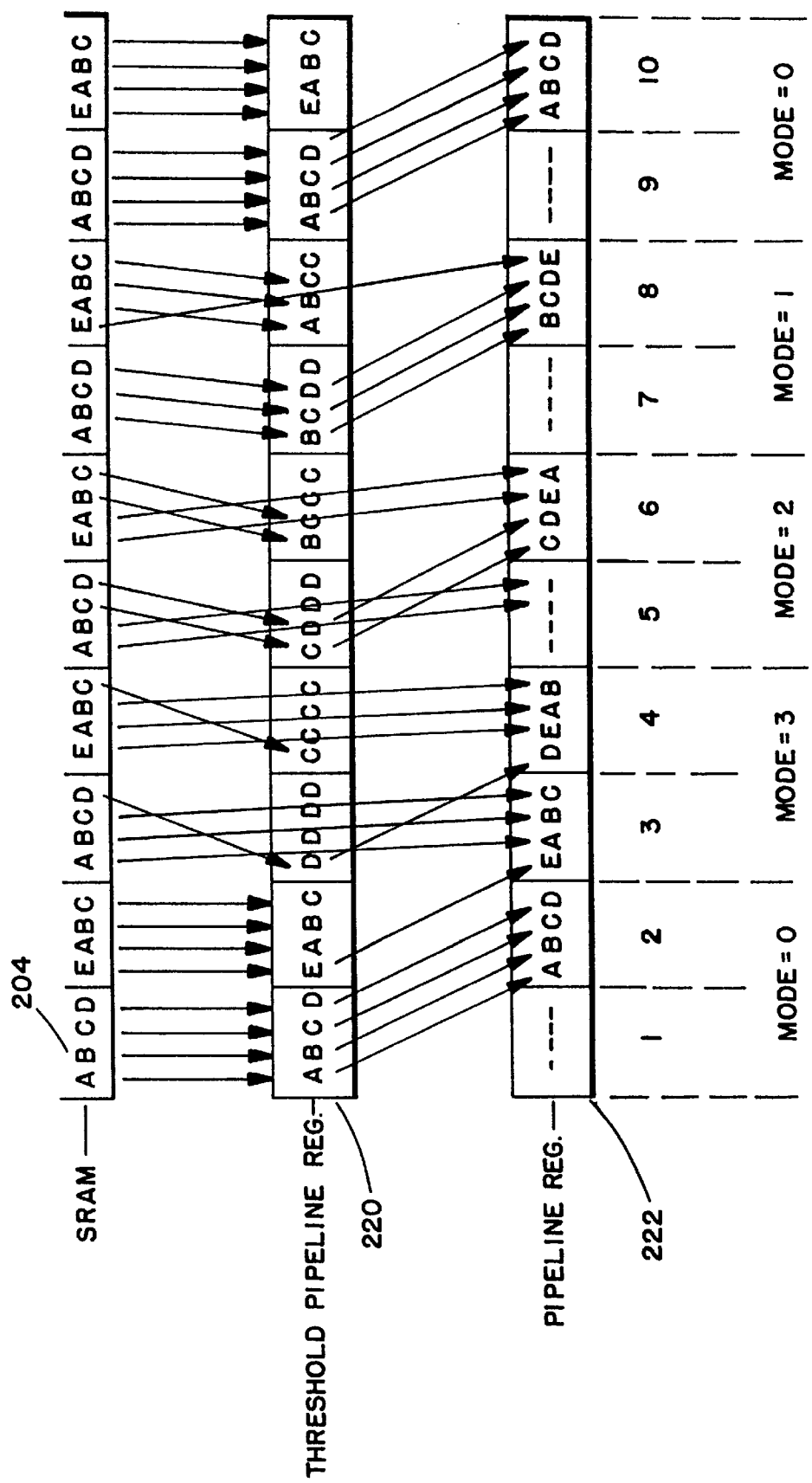
FIG. 14 illustrates the operation of a threshold matrix alignment procedure.

The switching which occurs in each of threshold alignment switches 216 and 218 in response to various mode inputs will be understood with respect to the example shown in FIG. 14. Assume that the threshold matrix has a width W=5 which, it turns out is a least efficient and somewhat "worst case" circumstance in which the system can perform. The respective threshold pixel values, comprising a threshold width of W, will be hereafter referred to as bytes A, B, C, D and E. FIG. 14 illustrates the consecutive bytes of threshold pixel values after alignment and insertion into threshold register 222. Thereafter the respective threshold pixel values are compared in comparators 206 with the scaled source image pixels from register 208. FIG. 14 provides a clock-by-clock showing of the contents of threshold staging register 204, threshold pipeline register 220 and threshold register 222. During clock cycles 1 and 2, controller 100 applies mode=0 to threshold alignment switches 216 and 218. As a result, a straight-through pipelining of threshold matrix pixel values occurs from the SRAM into threshold register 220.

Only at the end of a threshold row is a mode change triggered and in this case, controller 100 transitions from mode=0 to mode=3. Under such circumstances (in clock cycle 3), each register position in threshold pipeline register 210 receives the value of threshold pixel byte D and the A, B and C threshold pixel bytes are directly input into the three lower order byte positions in threshold register 222. From the previous clock cycle, threshold pixel byte E is resident in the highest order byte position. Thus, when a succeeding clock cycle occurs, the threshold pixel values E, A, B and C are written into comparators 206.

During clock cycle 4, byte D is entered into pipeline register 222 from pipeline threshold register 220 and bytes E, A and B are loaded directly from SRAM 204. The operation progresses through modes 2 and 1 during clock cycles 5–8, as shown, and then repeats.

Note that when the threshold matrix is tiled to coincide with the destination image resolution, there may be an offset in the ending bytes (if each threshold row is not an integer sub-multiple of the destination image). In such a case, the threshold matrix byte values at the end of a row in SRAM are "filled in" to assure a concurrent ending of both the threshold matrix row and the destination image. For example, during clock cycle 4, bytes A and B are used to fill in the word which is entered into pipeline register 222.

Because of the lack of unique, threshold pixel values associated with the 4 bytes containing the last byte (5th) of the threshold pixel row, gaps in the result stream (i.e., contents of threshold register 222) occur. For instance, at the end of clock cycle 4, C bytes reside in all positions within threshold pipeline register 220. For a valid word (4 bytes) to issue from pipeline register 222 during clock cycle 5, the two high order bytes should be C and D, but there is no D value in threshold pipeline register 220 to load into pipeline register 222. As a result, the word loaded into pipeline register 222 is invalid. When the invalid word is sent to comparators 206, invalid bilevel data results. However, controller 100 inhibits the latching of the bilevel output data into bilevel register 230 and further inhibits the insertion of new scaled source pixels into scaled image source register 208. When a next valid word issues from threshold register 222, the comparison procedure recommences.

Again, a threshold matrix with a W of 5 is a least efficient case and the mode signal changes every other clock cycle. Three of the eight clock cycles yield invalid data. When the mode signal does not change, for other values of W, valid threshold matrix 4-byte groups emerge from threshold register 222 every clock cycle and the longer the threshold row, the better the efficiency as the mode signal can only change on a row boundary. The most common threshold matrix is 16×16 and using that matrix, and any other matrix whose W is a multiple of 4, results in a constant mode signal operation.

Returning to FIG. 12, comparators 206 respond to outputs from threshold register 222 and scaled image source register 208 by comparing the respective grey level values of corresponding bytes. If the scaled image source pixel value is greater than the threshold register pixel value, then a 1 bit issues from the respective comparator. Under other circumstances, a 0 bit issues from the respective comparator and is input into a 32 bit bi-level register 230. When 32 bit bi-level register 230 is full, it's contents are written into SRAM 86 for storage.

The system handles the invalid words that are generated when W and N are not the same, or exact multiples of each other, by employing 2 variables. The first variable is "mode" which has been discussed above and determines how threshold pixel data is switched into threshold pipeline register 220 and threshold register 222. The second variable is termed "mode delta" and indicates how much to change the "mode" variable when an end of a threshold row is experienced and a next row of threshold pixel data is started. Mode delta is set equal to the number of bytes in a word that are "left over" after a last byte in a threshold row has been processed. The mode delta variable is applied every time a threshold row is "restarted."

The aforesaid variables enable a threshold matrix, where W is not equal to N, to be employed and also to determine when there are N invalid bytes in threshold register 222. Using only the mode and mode delta variables, it is possible to know when an invalid word is generated from the logic shown in FIG. 12.

As above indicated, mode delta is equal to a number of threshold pixels that remain in a threshold row. The maximum value of mode is: N−1. When mode delta is added to mode at the end of a threshold row and the result exceeds N−1, then the first word (e.g. 4 bytes) resident in threshold register 222, at the start of a new threshold matrix row, is invalid. In the example given above, there are four values of mode (i.e., 0–3) and the maximum value of mode is 3 (i.e., 4−1=3). The sum of mode and mode delta (modulo N) determines what a next mode value will be. For example, if mode delta is 2 and mode is 3, the sum thereof is 1(modulo 4) and mode 1 is the next applied control state. When a mode delta value (i.e. =3) is added to a current mode value, and the sum exceeds the value of 3, then the word (4 bytes) which exits from threshold register 222 is invalid.

By way of example in a threshold row restart case, if the value of mode is 0 and a mode delta of 3 is added to 0, the maximum value of 3 isn't exceeded. Thus, the first word generated for a mode 3 case is valid. When, however, the mode delta value is again added to it, the result is 6 which exceeds the maximum value, so the first word is invalid. The mode value is the result of a modulo 4 function—so it becomes 2. Every time a wrap occurs to the start of a threshold row, this process re-occurs.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for converting a source image including source pixels arranged in a first resolution of rows and columns, each source pixel manifesting a multi-bit grey level value, to a destination image of binary pixels arranged in a second resolution of rows and columns, said system comprising:

memory means for storing at least a portion of a row of said source pixels, a grey level threshold matrix and a relative index input array (RIIA) comprising a single index bit for each column of said destination image, each index bit enabling a source pixel value to be identified for scaling of said source image to said second resolution;

scale logic means responsive to each index bit and said source pixels to associate at least one said source pixel with each column of said destination image;

tile logic means for aligning said threshold matrix with a reference pixel in said destination image and for duplicating said threshold matrix sufficient times to tile said threshold matrix across said destination image; and comparator means for comparing each said source pixel associated with a column of said destination image with a correspondingly located grey level pixel value of said threshold matrix and for assigning a binary value in accordance with said comparing.

2. The system as recited in claim 1, wherein said memory means is a random access memory (RAM) with an addressing means and a single data bus for readout of data therefrom, said RAM further storing scaling data which indicates a relative resolution difference between said first resolution and said second resolution, said system further comprising:

control means responsive to said scaling data to allocate a first section of said RAM for storage of at least a portion of said source image and a second section of said RAM for storage of at least a portion of said destination image.

3. The system as recited in claim 2, wherein said control means is responsive to said scaling data to adjust sizes of said first section and second section in accordance with relative amounts of data to be stored therein.

4. The system as recited in claim 2, wherein said control means calculates said RIIA in accordance with said scaling data.

5. The system as recited in claim 2, wherein said control means operates said scale logic means to operate upon a first subset of source pixels read from said RAM and along one row of said source image and then to operate upon at least an additional, positionally corresponding, subset of source pixels in a succeeding row of said source image by reusing said first subset of source pixels and thereby avoiding a need for an additional output of source pixels from said RAM.

6. The system as recited in claim 5, wherein said control means reuses said subset of source pixels for each of a plurality rows of said source image, said plurality of rows determined from said scaling data.

7. The system as recited in claim 2, wherein said memory means, scale logic means, tile logic means, comparator means and control means are incorporated into an application-specific integrated circuit.

8. A system for converting a source image including source pixels arranged in a first resolution of rows and columns, each source pixel manifesting a multi-bit grey level value, to a destination image of binary pixels arranged in a second resolution of rows and columns, said system comprising:

memory for storing at least a portion of a row of said source pixels, a grey level threshold matrix comprising plural grey level threshold pixel values and a relative index input array (RIIA) comprising a single index bit for each column of said destination image, each index bit enabling a source pixel value to be identified for scaling of said source image to said second resolution;

an index bit register for receiving plural index bits from said memory;

a threshold register for receiving N threshold pixel values from said memory, where N is an integer >1;

a source register for receiving N source pixels from said memory;

scale logic means coupled to said index bit register and said source register and having N destination image column outputs, said scale logic means responsive to each index bit to output one source pixel on each of said N destination image column outputs;

alignment switch means coupled to said threshold register and responsive to a clock input for providing N threshold pixel value outputs;

comparator means coupled to said scale logic means and said alignment switch means and responsive to a clock input for comparing each said source pixel on each of said N destination image column outputs with a corresponding position one of said N threshold pixel value outputs and for assigning a binary value in accordance with said comparing; and control means for loading said index bit register, said source register and said threshold register with values from said memory and for thereafter enabling clock signals to synchronously operate said system to output, in parallel, N destination image binary values per clock cycle.

9. The system as recited in claim 8, wherein said control means initiates a wait period to enable said loading and thereafter synchronously operates said system.

10. The system as recited in claim 8, wherein said scale means comprises:

a scale register for storing plural source pixel grey level values; and switch means responsive to index bit inputs from said index register to connect each one of said N source pixels in said source register to a storage position in said scale register in accord with a value of an input index bit.

11. The system as recited in claim 8, wherein said alignment switch means comprises a threshold pipeline register and a threshold output register, a first logic switch coupled between said memory and said threshold pipeline register and a second logic switch coupled between said threshold pipeline register and said threshold output register, both said threshold pipeline register and threshold output register including N storage positions, and wherein said threshold matrix comprises plural rows of grey level threshold values, each row including at least W pixel values, where W is an integer and >1;

said control means applying, during succeeding clock cycles, a mode control signal to cause a first N threshold pixel values to be entered into said threshold pipeline register and then into said threshold output register; and said control means applying, during a further clock cycle, a mode control signal to cause a second N said threshold pixel values to be entered into said threshold pipeline register and, if W>N, causing excess ones of said first threshold values from said memory means to be entered into contiguous lower order positions of said threshold output register.

* * * * *